United States Patent [19]

Stich

[11] 3,855,520

[45] Dec. 17, 1974

[54] CONTROL HAVING CONDUCTION LIMIT MEANS TO VARY DUTY CYCLE OF POWER SWITCH

[75] Inventor: Frederick A. Stich, Milwaukee, Wis.

[73] Assignee: Allis-Chambers Corporation, Milwaukee, Wis.

[22] Filed: Dec. 22, 1972

[21] Appl. No.: 317,596

[52] U.S. Cl.................... 323/19, 307/237, 307/254, 317/31, 318/139, 318/341, 323/22 T, 323/23, 323/DIG. 1
[51] Int. Cl. ............................................. H02p 7/14
[58] Field of Search ........... 307/237, 240, 254, 296; 317/31; 318/139, 333, 341; 321/2 323/17, 19, 22 T, 23, 38, DIG. 1

[56] References Cited
UNITED STATES PATENTS

| | | | |
|---|---|---|---|
| 3,064,175 | 11/1962 | Vergez | 323/23 X |
| 3,349,309 | 10/1967 | Dannettell | 318/341 |
| 3,566,143 | 2/1971 | Paine et al. | 323/DIG. 1 |
| 3,617,845 | 11/1971 | McKenna | 318/341 |
| 3,694,721 | 9/1972 | Henry | 318/341 |
| 3,721,836 | 3/1973 | Rippel | 323/DIG. 1 |

Primary Examiner—A. D. Pellinen
Attorney, Agent, or Firm—Lee H. Kaiser

[57] ABSTRACT

A pulse width modulation control for supplying variable width voltage pulses from a battery to a motor includes a power switch, an oscillator for providing a succession of triggering pulses, a monostable multivibrator operated by each triggering pulse to generate a rectangular guard pulse, a bistable logic gate latch triggered by each guard pulse to a first condition wherein it generates a control signal to turn on the power switch, a variable delay circuit operated by each triggering pulse to initiate a timing interval and to provide a timing signal after a selectively variable time delay which triggers the bistable latch to a second condition wherein it removes the control signal to thereby turn off the power switch, a conduction limit circuit which senses the collector-to-emitter voltage across the power switch and generates a conduction limit signal when the power switch comes out of saturation, a first logic gate between the bistable latch and the power switch which, when enabled, transmits the control signal to turn on the power switch, and a second logic gate which is operated by the conduction limit signal in the absence of a guard pulse to disable the first gate to thus turn off the power switch and reduce the duty cycle of each voltage pulse and is operated by each guard pulse to enable the first gate and thus permit the power switch to turn on at the beginning of each voltage pulse.

27 Claims, 21 Drawing Figures

3,855,520

CONTROL HAVING CONDUCTION LIMIT MEANS TO VARY DUTY CYCLE OF POWER SWITCH

BACKGROUND OF THE INVENTION

Variable duty cycle controls are known wherein a power switch of the transistor type is in series with an electrical power source and a load, and the power switch is periodically turned on and off to regulate the average voltage supplied to the load. A base driver may transmit a succession of base drive pulses to the power switch of sufficient magnitude to maintain it in saturation, and the average voltage supplied to the load may be regulated by controlling the width of the driving pulses such as in a pulse width modulation (PWM) control. Known PWM controls require that high currents quickly charge a timing capacitor in order to obtain duty cycles approaching zero percent, and such rapid rate of rise circuits introduce noise and necessitate use of expensive transistors of higher current rating. Further, known pulse width modulation control systems are expensive and complicated to fabricate because they are constructed of discrete components and do not permit use of integrated circuits. Change in load in a variable duty cycle control may draw more current from the power switch and cause it to come out of saturation and move into the active region with resultant increased voltage drop across the switch and increased heat losses which may cause the transistor to fail.

Protection circuits for preventing failure of the transistors of the power switch are known, but they are generally of the type which sense the voltage drop across a resistance in series with the power switch and thus introduce undesired I²R heating losses. Further such protection circuits have a fixed current triggering level which prevents it from adapting to changing switch conditions such as occur when one of several paralleled transistors fail. Such protective circuits with a fixed current triggering level require that the power switch design be to the worst case conditions and thus prevents operation of the transistors up to their capability. For example, if the gain of a plurality of paralleled transistors varies in the range from 10 to 30, a control with a fixed current triggering level must be designed for a gain of 10 to assure that the transistor with the lowest gain will not fail. Consequently, the collector current in all of the other transistors would be limited to that resulting from a gain of 10, whereas most of the transistors are capable of carrying higher collector current without danger of failure.

It is an object of the invention to provide an improved variable duty cycle control wherein the percent duty cycle may be varied over a greater range than in prior art apparatus.

It is a further object of the invention to provide such an improved variable duty cycle control which may utilize integrated circuits and does not require as many discrete components as in prior art apparatus.

It is another object of the invention to provide a new and improved variable duty cycle control using a power switch of the transistor type which does not require a transistor protective circuit having a fixed current triggering level. Another object is to provide such a variable duty cycle control having a triggering level for protecting the power switch transistors which readily adapts to changed switch conditions such as occur when one of the paralleled transistors fails. A further object is to provide such a variable duty cycle control wherein the power switch need not be designed to the worst case condition and the power switch transistors can be operated up to their current carrying capabilities without danger of transistor failure. Still another object is to provide such a variable duty cycle control using a power switch of the transistor type wherein the triggering level of the transistor protective circuit is not a function of the magnitude of load current carried by the power switch but rather is dependent upon the voltage drop across the power switch.

SUMMARY OF THE INVENTION

A control for supplying variable duty cycle pulses from an electrical power source to a load has means for providing a succession of control pulses, a power switch of the transistor type regulated by the control pulses for connecting the load to the power source, means for selectively varying the duty cycle of the control pulses, and conduction limit means responsive to the voltage across the power switch exceeding a predetermined magnitude for overriding the duy cycle varying means and reducing the duty cycle of the control pulse. The means to reduce the duty cycle of the control pulse may include means to generate a narrow guard pulse at the leading edge of each control pulse whose duration is greater than the interval required for the power switch to turn on, means operated by each guard pulse to turn on the power switch, and means responsive to the conduction limit signal in the absence of a guard pulse for terminating each control pulse to thereby turn off the power switch and reduce the duty cycle. The control may also include first logic gate means adapted when enabled to transmit the control pulse to the power switch and second logic gate means operated by each guard pulse to enable the first gate means to permit the power switch to turn on and operated by the conduction limit signal in the absence of a guard pulse to disable the first gate means and thereby turn off the power switch.

In a preferred pulse width modulation embodiment, an oscillator provides a succession of triggering pulses, a monostable multivibrator is operated by each triggering pulse to generate a rectangular guard pulse of sufficient duration to permit the power switch to turn on, a variable delay circuit is operated by each triggering pulse and provides a timing signal after a selectively variable time delay, a bistable latch is operated by each guard pulse to a first condition wherein it generates a control signal to turn on the power switch and is subsequently operated by the timing signal to remove the control signal and turn off the power switch. A conduction limit circuit senses the collector-to-emitter voltage across the power switch and generates a conduction limit signal when the transistors come out of saturation. First logic gate means between the bistable latch and the power switch is adapted when enabled to transmit the control signal to turn on the power switch, and second logic gate means is operated by the conduction limit signal in the absence of a guard pulse to disable the first gate means and thereby turn off the power switch and is operated by each guard pulse to enable the first gate means to thereby permit the power switch to turn on during each guard pulse.

BRIEF DESCRIPTION OF THE DRAWING

These and other objects and advantages of the invention will be more readily apparent from the following detailed description when considered in conjunction with the accompanying drawing wherein.

DETAILED DESCRIPTION

Figure 1:
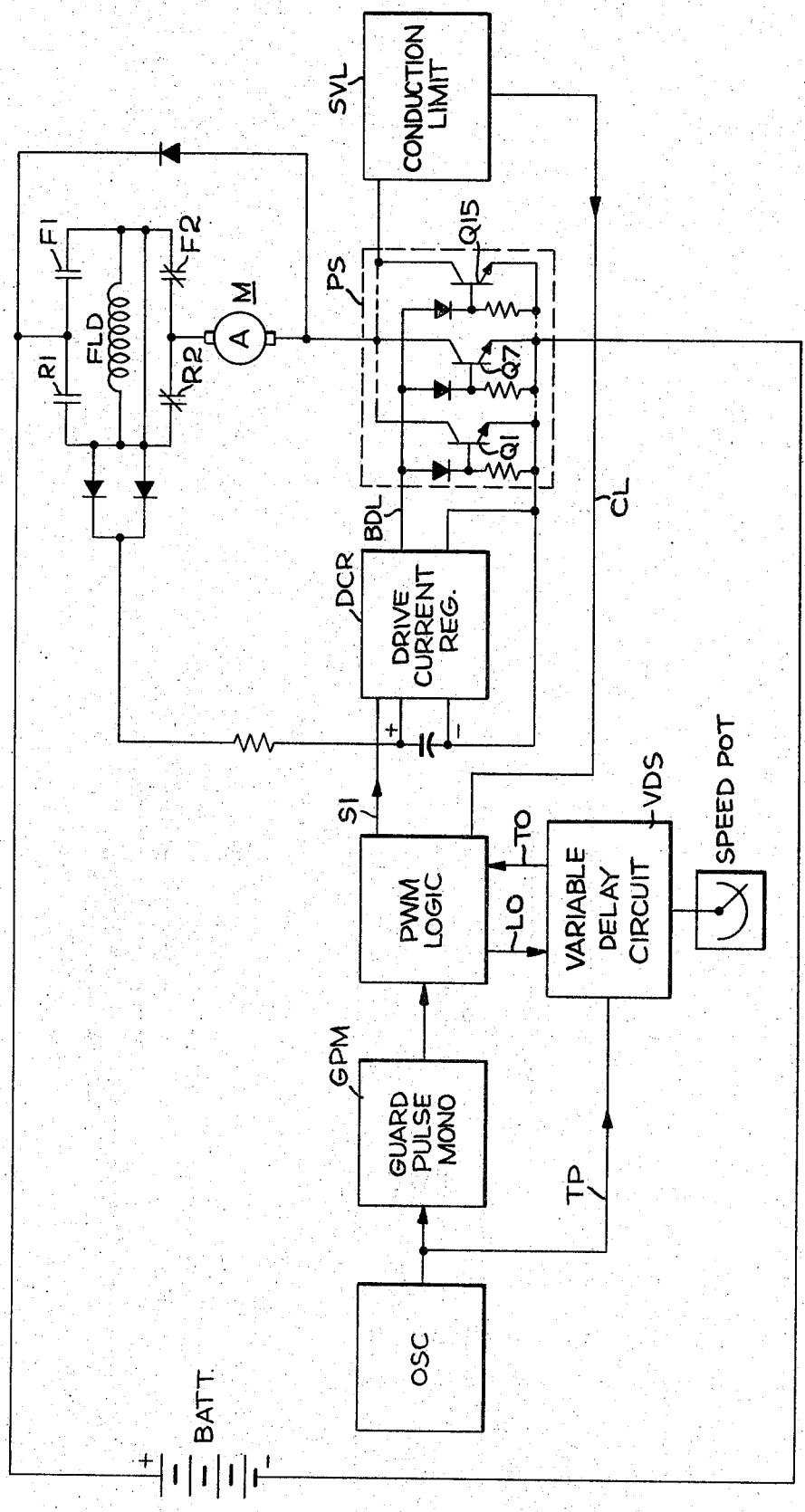
FIG. 1 is a schematic diagram in block form of a pulse width modulation control embodying the invention.

A preferred embodiment of the invention is represented in block form in FIG. 1 which illustrates a pulse width modulation control for a DC series traction motor M having an armature A and a field winding FLD for driving the wheels of a fork lift truck (not shown). Armature A may be connected in series with field winding FLD and a power switch PS across the terminals of a battery BATT through the contacts F1 of a forward contactor and R2 of a reverse contactor to drive motor M in one direction to propel the lift truck forward or through the contacts R1 of the reverse contactor and F2 of the forward contactor to reverse motor M and propel the lift truck to the rear.

Motor M is energized by unidirectional pulses of current from battery BATT conducted by power switch PS, and the speed of motor M is adjusted by the pulse width modulation (PWM) system which controls the duty cycle of the variable width pulses of voltage applied to motor M to proportionally vary the average voltage applied to the motor. Power switch PS may be of the type disclosed in the copending application of Raymond G. Price, Frederick A. Stich and David L. Moore, Ser. No. 317,595, filed Dec. 22, 1972 entitled Variable Time Ratio Control Having Power Switch Which Does Not Require Current Equalizing Means and having the same assignee as this invention, now U.S. Pat. No. 3,803,471 and may comprise a plurality of paralleled single-diffused silicon power transistors Q1, Q7, Q15, etc., whose base drive is supplied by a constant current switching regulator DCR and whose forward current transfer ratio, collector-to-emitter saturated voltage characteristic $V_{CE(sat)}$ and base-to-emitter voltage characteristic result in substantially balanced collector current levels in all of the paralleled transistors without the use of external current equalization means such as emitter resistors conventionally employed. Each transistor has a forward current transfer ratio versus collector current characteristic with a portion wherein ratio $h_{FE}$ decreases abruptly with increase of collector current, and regulator DCR supplies substantially constant base drive current pulses to the power transistor Q1-Q15 of sufficient magnitude so that they operate in saturation on said portion where gain decreases with increase in collector current so that each transistor is, in effect, self limiting and a balanced current level is reached in the paralleled transistors within their current carrying capabilities. Only three transistors Q1, Q7 and Q15 are represented in FIG. 1 but 15 transistors may be paralleled in a preferred 225 ampere embodiment and the transistors may be of the type 2N3771 available commercially from RCA Corporation.

Figure 3:
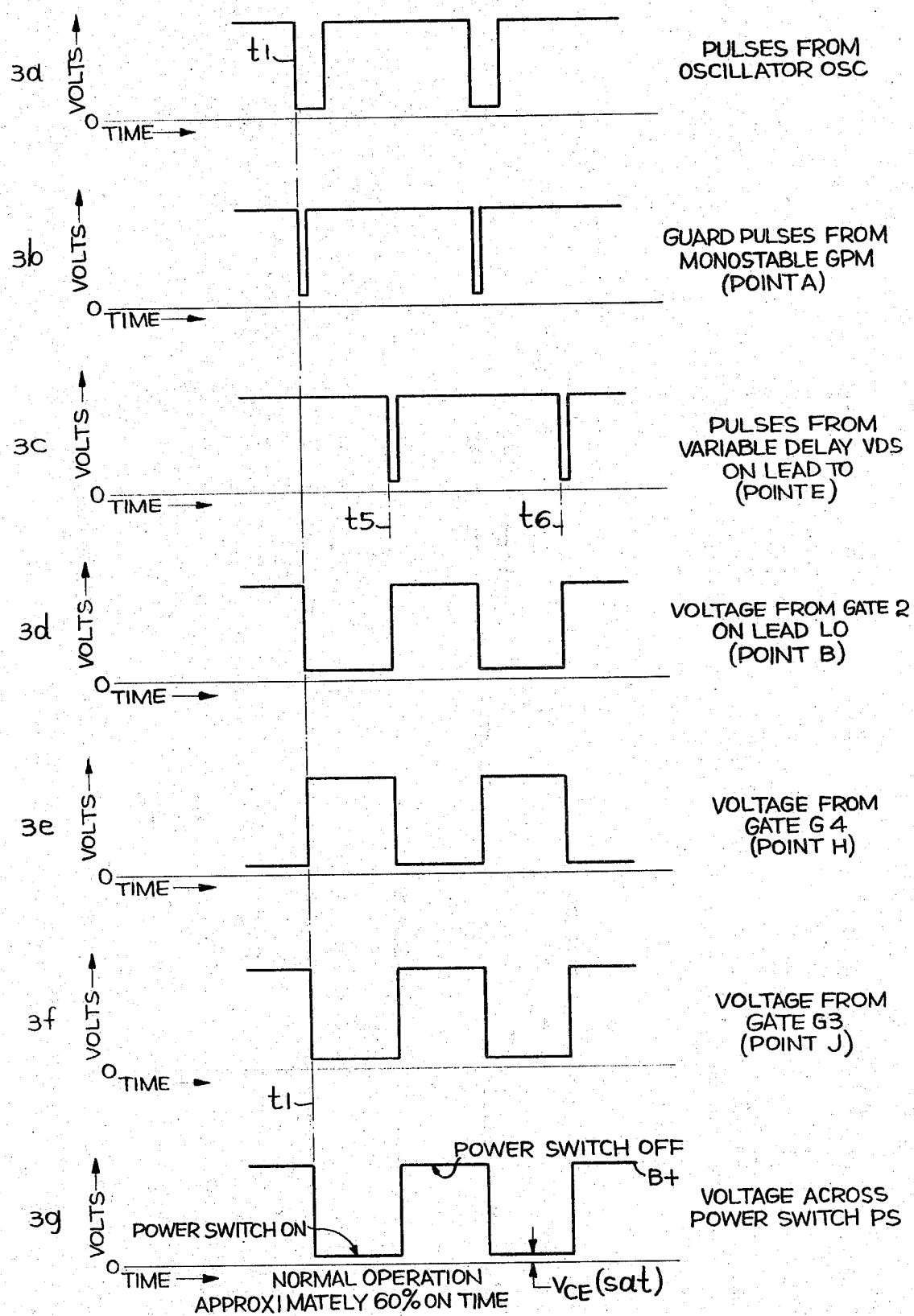
FIGS. 3a – 3g show waveforms at different points in the control when functioning normally with approximately 60 percent on-time of the power switch.
Figure 4:
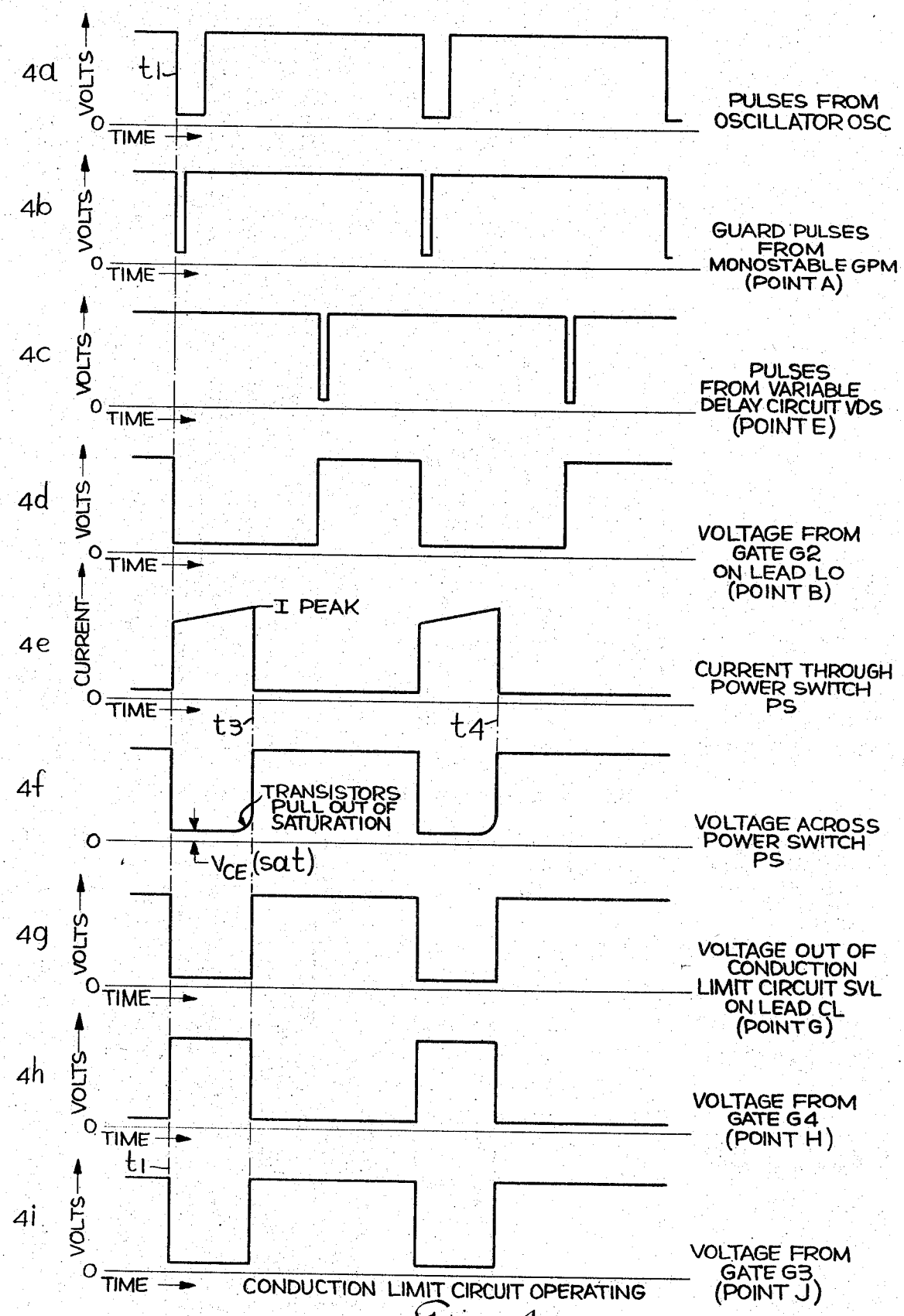
FIGS. 4a – 4i show waveforms at different points in the control when the power switch transistors pull out of saturation during each timing cycle.

The pulse width modulation (PWM) system may include an oscillator OSC shown in block form which produces a train of triggering pulses shown in FIGS. 3a and 4a that establish the frequency, preferably 300 Hz, of the PWM system. Each pulse from oscillator OSC is fed into a guard pulse monostable multivibrator GPM shown in block form and produces a negative-going guard pulse approximately 30 microseconds in width shown in FIGS. 3b and 4b each time it is triggered by a pulse from oscillator OSC. The output guard pulse from monostable GPM is fed to a PWM LOGIC circuit shown in block form in FIG. 1 and determines the minimum on-time of power switch PS and also establishes the maximum time that power switch PS can operate in the unsaturated mode after it is turned on. In the initial condition PWM LOGIC circuit maintains a logic 1 signal shown in FIG. 3d on a lead LO to a variable delay circuit VDS shown in block form which "locks out" circuit VDS and prevents it from initiating a time delay. Each guard pulse sets a bistable latch in the PWM LOGIC circuit (described hereinafter) which provides a logic 0 "control" signal at time $t1$ shown in FIG. 3f over a lead S1 to drive current regulator DCR to turn on power switch PS, and also provides a logic 0 signal on lead LO shown in FIG. 3d which permits variable delay circuit VDS to operate. Each triggering pulse from oscillator OSC is also fed over a lead TP to variable delay circuit VDS to discharge a timing capacitor and initiate a time delay interval.

A conduction limit circuit SVL shown in block form in FIG. 1 senses the voltage across power switch PS and provides a logic 0 signal shown in FIG. 4f over a lead CL to PWM LOGIC circuit when the power switch transistors Q1–Q15 are in saturation and at all other times provides a logic 1 signal over lead CL which causes the PWM LOGIC to turn off power switch PS. The logic 0 guard pulse shown in FIG. 4b prevents PWM LOGIC circuit from responding to the conduction limit circuit logic 1 output while transistors Q1–Q15 are turning on, thereby defeating the conduction limit circuit. If power switch transistors Q1–Q15 do not saturate during the 30 microsecond guard pulse, the PWM LOGIC circuit will respond to the logic 1 output from conduction limit circuit SVL shown in FIG. 4f at time $t3$ and $t4$ and turn off power switch PS.

Under normal conditions on-time of power switch PS is controlled by the time delay of variable delay circuit VDS, which, in turn, is a function of the position of the wiper of a speed potentiometer SPEED POT controlled by the lift truck operator. At the end of the time delay, variable delay circuit VDS provides a logic 0 signal on a lead TO (shown at $t5$ and $t6$ in FIG. 3c assuming 60 percent on-time of power switch PS) to PWM LOGIC circuit which resets the bistable latch therein to turn off power switch PS and to again provide logic 1 on lead LO shown in FIG. 3d to lock out the variable delay circuit VDS.

The PWM control includes a regulated 5 volt source using the battery BATT as the input but is not illustrated or described in order to shorten the description.

Variable Delay Circuit

Variable delay circuit VDS is "locked out," e.g., made inoperative by a logic 1 signal on lead LO shown in FIG. 3d from PWM LOGIC circuit and is activated by a logic 0 signal on lead LO. An RC timing circuit in variable delay circuit VDS is reset by each triggering pulse over lead TP from oscillator OSC, and variable delay circuit VDS provides a logic 0 signal shown in FIG. 3c at t5 and t6 on lead TD to terminate the control pulse and thus turn off power switch PS after a time delay determined by the settings of an inch potentiometer INCH POT and by the setting of a speed potentiometer SPEED POT whose position is controlled by a foot pedal FP on the lift truck. Thus variable delay circuit VDS is triggered by each oscillator pulse and provides an output pulse after a time delay determined by the setting of the speed potentiometer to turn off power switch PS. The time between the oscillator pulse shown in FIG. 3a and the output signal from delay circuit VDS shown in FIG. 3c is the on-time of power switch PS, and the time between the output pulse of delay circuit VDS and the next oscillator pulse is the off-time of power switch PS.

Variable delay circuit VDS includes a PNP charging current transistor Q8 whose collector current is varied to regulate the timing delay, a PNP timing transistor Q9 which is reverse biased by the logic 1 signal on lead LO to lock out delay circuit VDS and which is responsive to a predetermined timing capacitor voltage to turn on a NPN transistor Q19 which applies logic 0 to lead TO to reset the bistable latch in PWM LOGIC circuit to turn off power switch PS. The base of charging current transistor Q8 is coupled to a voltage divider comprising the serial arrangement of a resistance R79, a diode D7, and a resistance R21 connected between ground and the voltage source +5v. The collector of transistor Q8 is coupled through a timing resistance R23 in series with a timing capacitor C9 to ground. The serial arrangement of a resistance R22 and a capacitor C8 shunts timing resistance R23, and a positive temperature coefficient resistor PTCR mounted on drive current regulator PCR shunts capacitor C8 and normally has a relatively low resistance (e.g., 100 ohms) so that the voltage drop across capacitor C8 is normally very low and does not affect the timing interval. The emitter of PNP charging current transistor Q8 is connected to the +5v supply through the serial arrangement of an emitter resistance R24 and the INCH POT and SPEED POT potentiometers whose settings determine the magnitude of collector current in transistor Q8. When the voltage on the emitter of timing transistor Q9 reaches a predetermined level, timing transistor Q9 turns on, and the flow of current through collector resistance R28 forward biases the base of transistor Q10 which conducts to connect lead TO to ground and thus reset the bistable latch in PWM LOGIC circuit and turn off power switch PS. As the resistance of speed potentiometer SPEED POT is increased by depressing foot pedal FP, collector current in transistor Q8 will decrease so that the rate of rise of voltage at the emitter of transistor Q9 will be lower and the on-time of power switch PS will be longer. Diode D10 provides a path for the rapid discharge of timing capacitor C9 through conducting transistor Q9 and the base-emitter junction of Q10.

If the temperature of drive current regulator DCR should rise until positive coefficient temperature resistance PTCR is above its temperature switch point, its resistance rapidly increases to, in effect, remove the low resistance in shunt to capacitor C8. Capacitor C8 then charges through resistance R22 and causes the potential of the emitter of timing transistor Q9 to reach its triggering level more rapdily, thereby reducing the on-time of power switch PS and resulting in the PWM control phasing back to relatively low percent on-time, or low duty cycle, if the temperature limit of drive current regulator DCR is exceeded.

Each negative-going triggering pulse from oscillator OSC shown in FIGS. 3a and 4a over lead TP permits timing capacitor C9 to discharge through diode D8, thereby assuring that the timing capacitor C9 always starts charging from the same voltage level at the beginning of each timing cycle.

Variable delay circuit VDS is locked out or inactivated, by a logic 1 signal shown in FIG. 3d over lead LO from PWM LOGIC circuit which reverse biases the base of timing transistor Q9 so that it cannot be turned on. At the leading edge of each guard pulse a logic 0 signal is provided over lead LO from PWM LOGIC circuit to allow forward biasing of the base of transistor Q9, and thus activate delay circuit VDS, by clamping lead LO to ground in the PWM LOGIC circuit. The trip level of timing transistor Q9 is established by a voltage divider connected between the grounded LO lead and a +5v supply comprising the serial arrangement of a base resistor R25, resistance R27 and resistance R26 with the base of transistor Q9 coupled to the junction of R25 and R27.

The arrangement of timing resistor R23, timing capacitor C9 and timing transistor Q9 permits the duty cycle of the voltage pulses to approach 0 percent. Timing transistor Q9 is triggered by the voltage across the serial arrangement of a resistance R23 and a capacitance C9 so that the voltage applied to the emitter of transistor Q9 can be greater than the triggering level immediately after the cessation of the oscillator triggering pulse if the speed potentiometer resistance is high, thereby permitting logic 0 to appear on lead TO to turn off power switch PS after minimum on-time and consequently providing very low percent duty cycle. Further, if foot pedal FP is fully depressed, the initial voltage drop across timing resistance R23 seen by timing transistor Q9 is very small, and the voltage across timing capacitor Cp builds up slowly to the triggering level at a point very close to the succeeding triggering pulse from oscillator OSC, thereby permitting on-times of power switch PS equal to 100 percent of the control pulse width.

PWM LOGIC Circuit

PWM LOGIC circuit includes a bistable latch preferably comprising two interlocked NAND logic gates G1 and G2 with the output of each connected to one input of the other. The output of G2 is coupled through a NOT gate, or inverter NOT 1 to one input F of a three-input NAND gate G3 whose output J is coupled through an inverting buffer amplifier 1BA to lead S1 to the drive current regulator DCR. The output B of gate G2 is also connected to lead LO to variable delay circuit VDS. The logic 0 signal on lead TO shown in FIG. 3c at t5 and t6 when variable delay circuit VDS times out is coupled to an input E of NAND gate G2. Another input D to NAND gate G2 is from a relaxed pedal logic circuit RPL shown in block form in FIG. 2 which provides a logic 0 output when foot pedal FP is relaxed and a logic 1 signal when foot pedal FP is slightly depressed as described hereinafter. One input A of NAND gate G1 receives the guard pulses from guard pulse monostable circuit GPM shown in FIGS. 3b and 4b. A NAND gate G4 receives the guard pulses on one input A and the other input G is coupled to lead CL from conduction limit circuit SVL.

Under normal conditions when the fork truck ignition is turned on to apply power, the following conditions exist:

| | |
|---|---|
| Guard Pulse MONO (A) | Logic 1 — FIG. 3b |
| Gate G2 (B) on lead LO | Logic 1 — FIG. 3d |
| Gate G1 (C) | Logic 0 |
| Relaxed pedal logic (pedal depressed) (D) | Logic 1 |
| Lead TO from circuit VDS (E) | Logic 1 — FIG. 3c |
| Gate Not 1 (F) | Logic 0 |
| Conduction Limit on lead CL (G) | Logic 1 — FIG. 4a |
| Gate G4 (H) | Logic 0 — FIG. 4h |
| Gate G3 (J) | Logic 1 — FIGS. 3f and 4i |

Under these conditions logic 1 from gate G2 on lead LO locks out delay circuit VDS. A triggering pulse from oscillator OSC shown in FIGS. 3a and 4a at time t1 on lead TP discharges timing capacitor C9 in delay circuit VDS and also causes monostable multivibrator circuit GPM to apply a negative-going logic 0 guard pulse at time t1 shown in FIGS. 3b and 4b at point A which sets the bistable latch with logic 1 output from gate G1 at point C. The logic 1 from gate G1 is coupled to an input to gate G2 and changes its output at point B to logic 0 on lead TO shown at time t1 in FIG. 3d which unlocks delay circuit VDS. The logic 0 from gate G2 B is converted by gate NOT 1 to logic 1 input F to gate G3, and the negative-going guard pulse at point A changes the output of gate G4 to logic 1 at point H shown at time t1 in FIG. 3e which is an input to gate G3. Both inputs to gate G3 are now logic 1 and it provides a logic 0 output at point J shown at t1 in FIG. 3f which is the leading edge of the variable duty cycle control signal and results in turning on power switch PS. The following conditions now exist at time t1:

| | |
|---|---|
| Guard Pulse MONO (A) | Logic 0 — FIG. 3b |
| Gate G2 (B) on lead LO | Logic 0 — FIG. 3d |
| Gate G1 (C) | Logic 1 |
| Relaxed Pedal Circuit (D) | Logic 1 |
| Lead TO (E) | Logic 1 — FIG. 3c |
| NOT 1 (F) | Logic 1 |
| Conduction Limit (G) | Logic 1 — FIG. 4a |
| Gate G4 (H) | Logic 1 — FIG. 3e |
| Gate G3 (J) | Logic 0 — FIGS. 3f and 4i |

Conduction limit circuit SVL senses the $V_{CE}$ drop across power transistors Q1–Q15 while they are turning on and provides logic 1 at point G, but the logic 0 guard pulse at A maintains the output of gate G4 at logic 1. If power transistors Q1–Q15 are in saturation at the end of the 30 microsecond guard pulse, conduction limit circuit SVL will provide logic 0 on lead CL shown in FIG. 4g which will maintain the logic 1 output from gate G4 shown in FIG. 4h. However, if power transistors Q1–Q15 do not saturate during the guard pulse, the output of conduction limit circuit SVL on lead CL will be logic 1 at point G and point A will become logic 1 when the guard pulse disappears, thereby changing the output of gate G4 (H) to logic 0 and the output of gate G3 at point J to logic 1 to thereby terminate the control pulse and turn off power switch PS. FIG. 4e illustrates a condition wherein the power switch collector current increases to a value $I_{peak}$ wherein transistors Q1–Q15 pull out of saturation; the voltage $V_{CE}$ across power switch PS shown in FIG. 4f exceeds the triggering level; the output of conduction limit circuit SVL on lead CL changes from logic 0 to logic 1 as seen in FIG. 4g; the output of gate G4 (H) becomes logic 0 as shown in FIG. 4h; and the output from gate G3 (J) becomes logic 1 as shown in FIG. 4i to thereby terminate the control pulse and turn off power switch PS. Power switch PS will remain off until the next guard pulse appears at point A approximately 3.3 milliseconds after the preceding pulse. Power transistors Q1–Q15 are capable of handling full peak current and full battery voltage for 30 microseconds, and since the duty cycle is very small, power dissipation is not excessive.

If the foot pedal FP is relaxed, the relaxed pedal logic circuit RPL will provide logic 0 at point D which will change the output of gate G2 (B) to logic 1 and the output of gate G3 (J) to logic 1 to turn off power switch PS. When variable delay circuit VDS times out, transistor Q10 conducts to clamp lead TO to ground and thus apply logic 0 to an input E to gate G2, thereby resetting the bistable latch with logic 1 output B from gate G2. The logic 1 output from gate G2 at point B is converted by gate NOT 1 to logic 0 input F to gate G3 which changes its output at point J to logic 1 to turn power switch PS off. The logic 1 output from gate G2 (B) is applied to lead LO to inactivate variable delay circuit VDS and is also applied to an input to a gate G1 to change its output C to logic 0 and thereby reset the bistable latch. Gates G1, G2 and G3 are preferably in the same integrated circuit package.

Relaxed pedal logic circuit RPL thus turns off the PWM control when foot pedal FP is relaxed, and it also assures that the operator has released the foot pedal when switching between forward and reverse directions.

Figure 2:
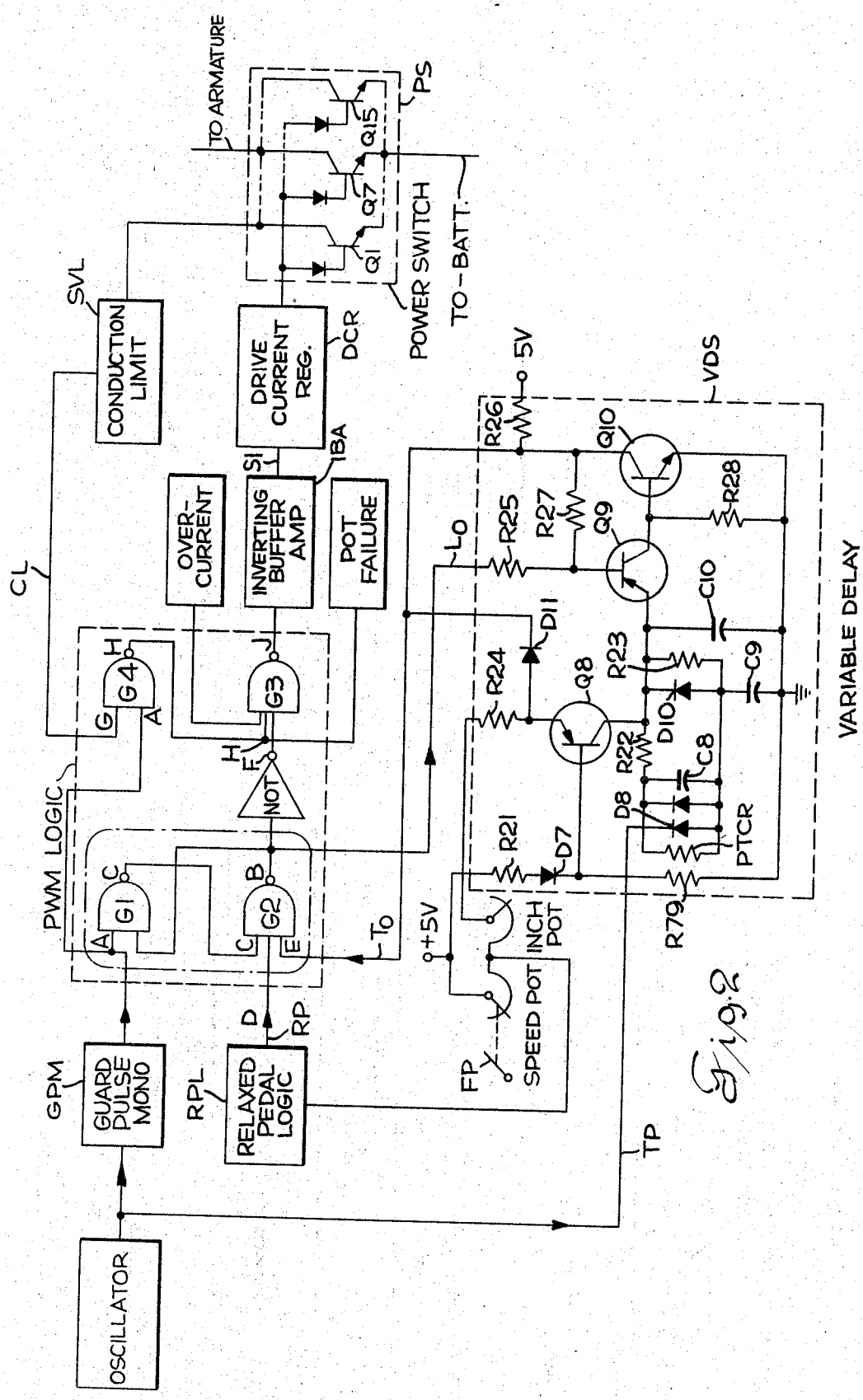
FIG. 2 is a schematic diagram of a portion of the control of FIG. 1 showing the PWM LOGIC circuit and the variable delay circuit in detail.

A potentiometer protection POT FAILURE circuit shown only in block form in FIG. 2 normally provides a logic 1 output but provides a logic 0 signal at point H if the speed potentiometer should open to thereby provide logic 1 from gate G3 at point J and terminate the control pulse to turn off power switch PS at the end of each guard pulse. The POT FAILURE circuit thus prevents the control from going to a 100 percent on-time state, as often occurred in prior art apparatus when the speed potentiometer failed, and limits the average voltage to motor M to a very low value.

Conduction Limit Circuit

Figure 5:
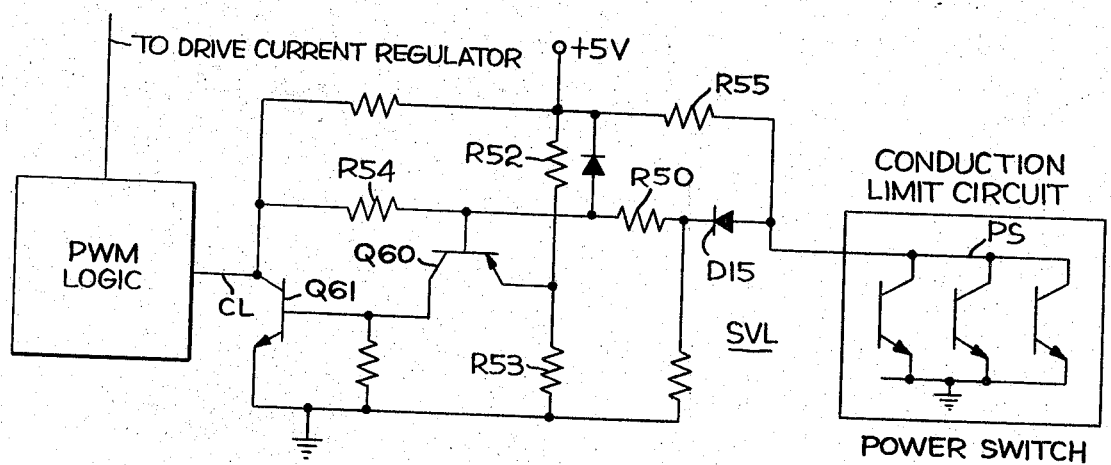
FIG. 5 is a circuit diagram of the conduction limit circuit which is shown in block form in FIGS. 1 and 2.

Conduction limit circuit SVL shown in block form in FIGS. 1 and 2 and in detail in FIG. 5 monitors the voltage drop $V_{CE}$ across transistors Q1–Q15 of power switch PS and provides a logic 1 signal shown in FIG. 4d at all times over lead CL to the PWM LOGIC circuit except when $V_{CE}$ is below a predetermined level, at which time it provides logic 0 voltage on lead CL. If the current through transistors Q1–Q15 increases as shown in FIG. 4e until the $V_{CE}$ drop exceeds a predetermined magnitude as represented in FIG. 4f conduction limit circuit SVL provides logic 1 shown in FIG. 4g at point G input to gate G4 of PWM LOGIC circuit which changes its output at point H shown in FIG. 4h to logic 0, thereby changing the output of gate G3 at point J to logic 1 to terminate each control pulse and each pulse over lead S1 to drive current regulator DCR and turn off power switch PS.

Figure 7:
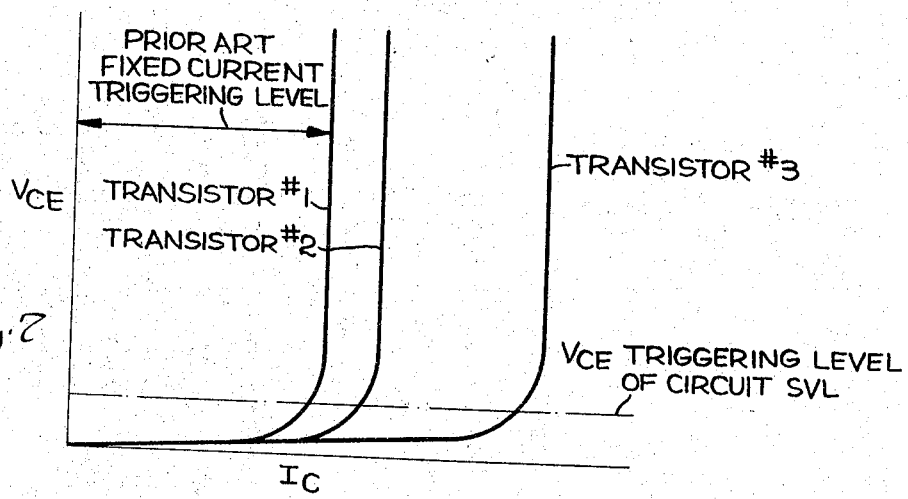
FIG. 7 illustrates how the triggering level of the transistor protection circuit adjusts for different states of the power switch.

FIG. 7 represents how the $V_{CE}$ vs. $I_c$ characteristics of several paralleled transistors may vary over a wide range and illustrates a representative fixed current triggering level used in transistor protection circuits of prior art variable time ratio controls. It will be appreciated that the power switch design had to be to the worst case condition since if the collector current of the transistor having the lowest gain increased until it came out of saturation, its $V_{CE}$ drop would rapidly rise to such a high value that failure could occur. Consequently, the remaining higher gain paralleled transistors conducted at collector current levels below their capabilities. Further, if the fixed current limit level were set at the total current flowing through a plurality of paralleled transistors, the protection circuit could not adapt to the changed switch condictions if one unit failed since a lesser number of remaining units now had to carry the same total current before any protection was provided. FIG. 7 also represents the fixed $V_{CE}$ triggering level of conduction limit circuit SVL, and it will be appreciated that this triggering level is independent of gain of the individual transistors, that the design of power switch PS need not be to the worst case condition, that conduction limit circuit SVL adapts to varying switch conditions since it provides the same degree of protection for the remaining transistors if one unit fails, and that each transistor Q1–Q15 may conduct at a collector current proportional to its again without triggering conduction limit circuit SVL.

When transistors Q1–Q15 of power switch PS are saturated, their collector voltage is low and is coupled through a diode D15 and a resistance R50 to the base of a PNP transistor Q60 which is forward biased and remains conducting to hold a transistor Q61 on and provide logic 0 on lead CL to the PWM LOGIC circuit. The emitter of transistor Q61 is connected to ground and its collector is connected to lead CL so that lead CL is at logic 0 voltage when transistor Q61 conducts. The emitter of transistor Q60 is coupled to the junction of two resistances R52 and R53 which are connected in series between a +5 volt source and ground so that the emitter of Q60 is biased between +5V and ground. When the power switch transistors Q1–Q15 pull out of saturation to the point where their collector voltage minus the forward drop of diode D15 equals the voltage on the emitter of transistor Q60 minus its base-emitter drop, transistor Q60 becomes reverse biased and turns off, thereby turning transistor Q61 off so that its collector voltage increases to provide logic 1 on lead CL to change the output of gate G4 to logic 0 and the output of gate G3 at point J to logic 1 to thus turn off power switch PS. Positive feedback from the collector of transistor Q61 through a resistance R54 to the base of transistor Q60 is provided to assure quick switching.

When power switch PS is turned off, the positive +5V source is coupled through a resistance R55, diode D15, and resistor R50 to reverse bias transistor Q60 and thus hold transistors Q60 and Q61 off and maintain logic 1 on lead CL. Further, if the connection from power switch PS to saturation voltage limit circuit SVL is accidentally opened, the base of transistor Q60 is reverse biased from the +5V source through R55, D15 and R50 to maintain transistor Q60 and Q61 off and logic 1 on lead CL so power switch transistors Q1–Q15 remain off.

Relaxed Pedal Circuit

Figure 6:
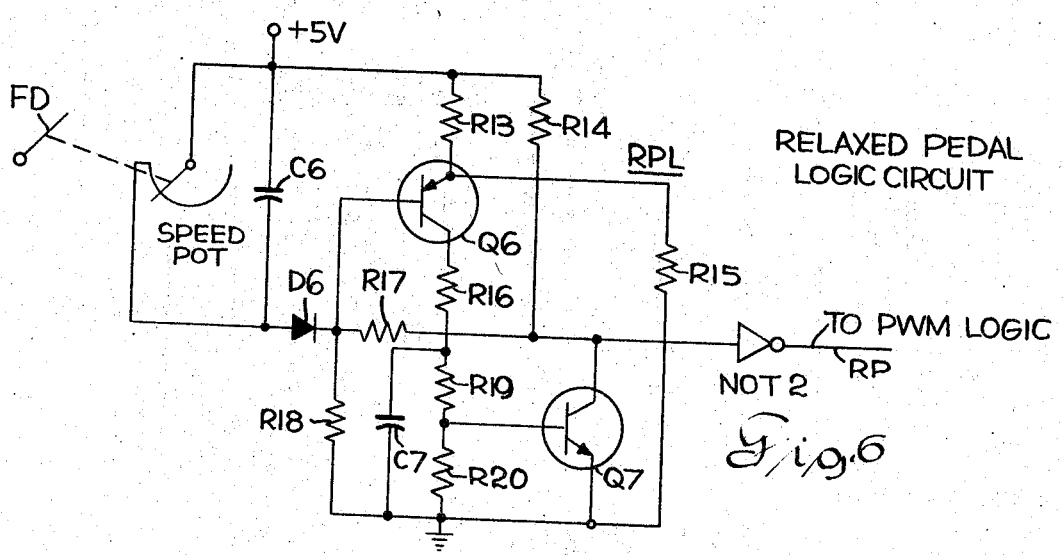
FIG. 6 is a circuit diagram of the relaxed pedal logic circuit which is shown in block form in FIG. 2.

The relaxed pedal logic circuit RPL represented in block form in FIG. 2 and shown in FIG. 6 senses the resistance of speed potentiometer SPEED POT and provides a logic 0 signal over lead RP to point D of PWM LOGIC circuit if foot pedal FP is relaxed so the SPEED POT resistance is very low and provides logic 1 on lead RP if foot pedal FP is depressed. When foot pedal FP is relaxed, only a small resistance exists between the wiper and one terminal of speed potentiometer SPEED POT. The wiper is connected to the +5V supply. The voltage drop across the slight resistance of speed potentiometer SPEED POT when foot pedal FP is relaxed maintains the base of a PNP transistor Q6 reverse biased so it is off. As long as transistor Q6 is off, the base of a NPN transistor Q7 is at ground potential and it remains non-conducting, and the logic 1 voltage existing at the junction of two resistances R14 and R17 of a voltage divider is connected by a NOT gate, or inverter NOT 2 to logic 0 on lead RP to PWM LOGIC circuit. This voltage divider comprises the series arrangement of three resistances R14, R17 and R18 connected between the +5V supply and ground.

The emitter of transistor Q6 is connected to the junction of two resistances R13 and R15 forming a voltage divider between the +5V supply and ground. The speed potentiometer SPEED POT is connected in series with a diode D6 and resistance R18 between the +5V supply and ground, and the base of transistor Q6 is coupled to the junction of diode D6 and resistance R18. Diode D6 is forward biased and keeps transistor Q6 turned off. As the foot pedal is depressed, the voltage across speed potentiometer SPEED POT increases and the potential at the base of transistor Q6 becomes more negative. As soon as the voltage drop across potentiometer SPEED POT plus the drop across diode D6 becomes greater than the base-emitter drop of transistor Q6 plus the voltage drop across resistance R13, transistor Q6 will start to turn on. The collector current through Q6 flows through resistances R16, R19 and R20 to ground, and the voltage drop across resistance R20 forward biases the base of NPN transistor Q7 relative to its grounded emitter, thereby turning Q7 on. The current flow through transistor Q7 develops a voltage drop across resistance R17 which increases the forward bias on the base of transistor Q6 and causes it to turn on "hard." The forward drop of diode D6 and the base-emitter drop of transistor Q6 are balanced against each other so that only a small voltage differential developed across the SPEED POT potentiometer is required to turn Q6 on. The voltage divider provided by resistances R13 and R15 provides an additional reverse bias voltage for transistor Q6 to "take up" the difference in the drop across diode D6 and the base emitter drop of transistor Q6.

Turning transistor Q7 on clamps the input gate NOT 2 to ground so that it provides logic 1 output on lead RP to the PWM LOGIC circuit when foot pedal FP is depressed.

While only a single embodiment of my invention has been illustrated and described, many modifications and variations thereof will be readily apparent to those skilled in the art, and consequently it should be understood that I do not intend to be limited to the particular embodiment shown and described.

The embodiments of the invention in which an exclusive property or privilege is claimed are defined as follows:

1. A control for supplying variable duty cycle pulses from an electrical power source to a load including, in combination, means for providing a succession of control pulses, means for selectively varying the duty cycle of said control pulses, a power switch regulated by said control pulses for connecting said power source to said load, conduction limit means for sensing the voltage across said power switch and for generating a conduction limit signal when said voltage exceeds a predetermined magnitude, and means responsive to said conduction limit signal for overriding said duty cycle varying means and reducing the duty cycle of said control pulses.

2. A control in accordance with claim 1 wherein said means to reduce the duty cycle of said control pulses includes means for generating a narrow guard pulse at the leading edge of each of said control pulses, and means responsive to each said guard pulse to turn on said power switch and being responsive to said conduction limit signal in the absence of said guard pulse to terminate each said control pulse and thereby turn off said power switch.

3. A control in accordance with claim 2 wherein said means responsive to each said guard pulse to turn on said power switch includes logic gate means receiving said control pulses and being adapted when enabled to transmit said control pulses to said power switch, means responsive to said conduction limit signal in the absence of said guard pulse to disable said logic gate means and thereby block transmission of said control pulses, and conduction limit defeating means responsive to said guard pulse to disable said last-named means.

4. In a control in accordance with claim 2 wherein said power switch includes a plurality of paralleled power transistors each of which has a forward current transfer ratio versus collector current characteristic with a portion wherein said ratio decreases abruptly with increase of collector current, said control includes means regulated by said control pulses for supplying substantially constant base drive to said power transistors of sufficient magnitude so that they operate on said portion wherein said ratio decreases abruptly with increase of collector current, and said conduction limit means senses the collector-to-emitter voltage across said paralleled power transistors.

5. A control in accordance with claim 1 wherein said means for overriding said duty cycle varying means includes means for generating a narrow guard pulse at the leading edge of each control pulse, means responsive to said conduction limit signal to terminate each said control pulse and thereby turn off said power switch, and means responsive to each said guard pulse to disable said last-named means.

6. A control in accordance with claim 5 wherein said means to terminate each said control pulse includes first logic gate means adapted when enabled and disabled respectively to transmit and block said control pulses to said power switch, and said means to disable said last-named means includes second logic gate means for controlling said first logic gate means and receiving said guard pulses and said conduction limit signal as inputs and being operated by each said guard pulse to enable said first logic gate means and being operated by said conduction limit signal in the absence of a guard pulse to disable said first logic gate means, said second logic gate means being nonresponsive to said conduction limit signal when a guard pulse is present.

7. A control in accordance with claim 1 including means for generating a narrow guard pulse at the leading edge of each of said control pulses, and means responsive to each said guard pulse to disable said duty cycle reducing means.

8. A control in accordance with claim 7 wherein said means for providing a succession of control pulses includes logic means for transmitting said control pulses to said power switch and being responsive to said conduction limit signal in the absence of a guard pulse to terminate said control pulse and thereby turn off said power switch, said logic means receiving said guard pulses as an input and being disabled by each guard pulse from responding to said conduction limit signal, whereby the conduction limit means is defeated during said guard pulse to permit said power switch to turn on.

9. A control in accordance with claim 8 wherein said means for providing a succession of control pulses includes means for providing a train of triggering pulses, variable delay means operated by each triggering pulse to provide a timing signal after a selectively variable time delay, said guard pulse generating means including a guard pulse monostable multivibrator which is operated to its unstable state by each said triggering pulses to derive a guard pulse, and wherein said logic means includes a bistable latch which is set by each guard pulse to establish the leading edge of a control pulse and is reset by each timing signal to establish the trailing edge of said control pulse.

10. A control in accordance with claim 8 wherein said guard pulse generating means includes a guard pulse monostable multivibrator which is operated to its unstable state at the leading edge of each of said control pulses.

11. A control in accordance with claim 1 and including base drive means for applying base drive to said power switch of sufficient magnitude to drive it into saturation, said base drive means being controlled by said control pulses.

12. A control in accordance with claim 1 wherein said means for providing a succession of control pulses and said means for varying the duty cycle thereof includes means for generating a train of narrow triggering pulses, variable delay means actuated by each triggering pulse to provide a timing signal after a selectively variable time delay, and bistable latch means set in response to said triggering pulses to establish the leading edge of said control pulses and reset in response to said timing pulses to establish the trailing edge of said control pulses.

13. A control in accordance with claim 12 wherein said duty cycle reducing means includes logic gate means between said bistable latch means and said power switch receiving the output of said latch means and being enabled and disabled to transmit and block said control pulses respectively when said latch means is set and reset and receiving said conduction limit signal as an input and being disabled by said conduction limit signal to block transmission of said control pulse.

14. A control in accordance with claim 13 and including means responsive to each said triggering pulse for preventing the disabling of said logic gate means for a predetermined time interval of sufficient duration to permit said power switch to turn on.

15. A control for applying variable duty cycle voltage pulses from an electrical power source to a load comprising, in combination,
means for providing a succession of triggering pulses, a power switch of the transistor type in series with said power source and said load,
variable delay means operated by each of said triggering pulses for providing a timing signal after a selectively variable time delay,
conduction limit means for sensing the collector-to-emitter voltage across said power switch and for generating a conduction limit signal when said voltage exceeds a predetermined magnitude,
means operated by each of said triggering pulses for turning on said power switch and operated by said timing signal to turn off said power switch so that said power switch applies variable duty cycle voltage pulses from said source to said load, and
means responsive to said conduction limit signal to operate said last-named means to turn off said power switch and thereby reduce the duty cycle of said voltage pulses.

16. A control in accordance with claim 15 wherein said means to reduce the duty cycle of said voltage pulses turns off said power switch to terminate said voltage pulses, and said control includes conduction limit defeating means to disable said duty cycle reducing means during the duration of each of said triggering pulses.

17. A control in accordance with claim 16 wherein said power switch includes a plurality of paralleled transistors each of which has a forward current transfer ratio versus collector current characteristic wherein said ratio decreases abruptly with increase in collector current, and said means for turning on said power switch includes means for supplying substantially constant base drive current to said paralleled transistors.

18. A control in accordance with claim 16 wherein said means for turning said power switch on and off includes bistable latch means operated to a first condition by each said triggering pulse to initiate a control signal and operated to a second condition by said timing signal to terminate said control signal, and wherein said power switch is controlled by said control signals.

19. A control in accordance with claim 18 wherein said means to reduce the duty cycle of said voltage pulses includes logic gate means between said bistable latch means and said power switch adapted when enabled and disabled respectively to transmit and to terminate said control signal, and
means receiving said triggering pulses and said conduction limit signal as inputs operated by each of said triggering pulses to enable said logic gate means and operated by said conduction limit signal in the absence of a triggering pulse to disable said logic gate means and being nonresponsive to said conduction limit signal when said triggering pulse is present.

20. In a control in accordance with claim 18 wherein said variable delay means is controlled by a speed potentiometer and including means responsive to a predetermined low resistance setting of said speed potentiometer for holding said bistable latch means in said second condition.

21. A control for supplying variable time ratio pulses from an electrical power source to a load including, in combination,
a power switch of the transistor type between said source and said load,
means for providing a succession of triggering pulses, variable delay means operated by each said triggering pulse for providing a timing signal after a selectively variable time delay,
conduction limit means for providing a conduction limit signal when the collector-to-emitter voltage across said power switch exceeds a predetermined magnitude,
bistable latch means operated to a first condition by each said triggering pulse to initiate a control signal to turn on said power switch and operated to a second condition by said timing signal to terminate said control signal,
logic gate means between said latch means and said power switch for transmitting and blocking said control signal when enabled and disabled respectively, said logic gate means being enabled and disabled when said latch means is respectively in said first and second conditions and also being disabled by said conduction limit signal in the absence of a triggering pulse, and means responsive to said triggering pulse to prevent said logic gate means from responding to said conduction limit signal.

22. A control in accordance with claim 21 wherein said power switch includes a plurality of paralleled transistors each of which has a forward current transfer ratio versus collector current characteristic with a portion wherein said ratio decreases abruptly with increase of collector current, and including base drive means regulated by said control signal for applying substantially constant base drive current of sufficient magnitude to said transistors so that they operate in saturation on said portion wherein said ratio decreases abruptly with increase of collector current.

23. In a control in accordance with claim 22 wherein each of transistors is of the type which may operate in the active region for a predetermined time interval without failure, and said means for providing a succession of triggering pulses includes a monostable multivibrator which generates triggering pulses whose duration is greater than said predetermined interval.

24. In a control in accordance with claim 21 wherein said variable delay means is controlled by a speed potentiometer, and including means for generating a low resistance signal when the resistance of said speed potentiometer is below a predetermined value, and wherein said bistable latch means is held in said second condition by said low resistance signal.

25. A control for supplying variable time ratio pulses from an electrical power source to a load comprising, in combination,
- a power switch between said source and said load comprising a plurality of paralleled power transistors of the type whose forward current transfer ratio decreases abruptly with increase of collector current,
- means for supplying substantially constant base drive to said power switch,
- an oscillator for providing a succession of triggering pulses,
- a monostable multivibrator triggered by each oscillator output pulse to generate a rectangular guard pulse,
- variable delay means operated by each said triggering pulse to provide a timing signal after a selectively variable time delay,
- conduction limit means for providing a conduction limit signal when the collector-to-emitter voltage across said power switch exceeds a predetermined magnitude,
- bistable latch means triggered to a first condition by each said guard pulse to initiate a control signal to turn on said base drive current supplying means and triggered to a second condition by said timing signal to remove said control signal, and
- logic gate means between said latch means and said base drive current supplying means adapted when enabled and disabled to respectively transmit and block said control signal, said logic gate means being enabled and disabled when said bistable latch means is respectively in said first and second conditions and also being disabled by said conduction limit signal in the absence of a guard pulse, and conduction limit defeating means responsive to said guard pulse for preventing the disabling of said logic gate means.

26. A variable time ratio control for supplying variable duty cycle pulses from an electrical power source to a load comprising, in combination,
- means for providing a succession of control pulses,
- means for providing a narrow pulse at the leading edge of each control pulse,
- a transistor power switch controlled by said control pulses for connecting said power source to said load,
- duty cycle varying means for selectively varying the duty cycle of said control pulses,
- sensing means for providing a limit signal when the collector-to-emitter voltage across said transistor power switch exceeds a predetermined magnitude,
- conduction limit means responsive to said limit signal for overriding said duty cycle varying means and reducing the duty cycle of said control pulses, and
- means responsive to each said narrow pulse to defeat said conduction limit means.

27. A control in accordance with claim 26 wherein said means for providing a narrow pulse includes monostable multivibrator means for providing a narrow guard pulse of constant width at the leading edge of each of said control pulses, and
- logic means receiving said control pulses and said guard pulses and said limit signals as inputs for transmitting said control pulses to said power switch and being responsive to said limit signal in the absence of a guard pulse to block transmission of said control pulses and being nonresponsive to said limit signal when said guard pulse is present.

* * * * *